United States Patent [19]

Lee et al.

[11] 4,364,909

[45] Dec. 21, 1982

[54] REMOVAL OF CA++ FROM MGCL$_2$

[75] Inventors: John M. Lee; William C. Bauman, both of Lake Jackson, Tex.

[73] Assignee: The Dow Chemical Company, Midland, Mich.

[21] Appl. No.: 244,377

[22] Filed: Mar. 16, 1981

[51] Int. Cl.$^3$ .............................................. C02F 1/42
[52] U.S. Cl. .................................. 423/157; 210/670; 210/687
[58] Field of Search ................ 210/670, 687; 423/157

[56] References Cited

U.S. PATENT DOCUMENTS

| | | | |
|---|---|---|---|
| 1,485,334 | 2/1924 | Kriegsheim | 210/687 |
| 2,902,445 | 9/1959 | Matthews | 210/687 |
| 3,112,176 | 11/1963 | Haden et al. | 423/329 |
| 4,094,778 | 6/1978 | Denny et al. | 210/687 |
| 4,298,477 | 11/1981 | Cole | 210/687 |
| 4,305,826 | 12/1981 | Moses | 210/687 |
| 4,311,609 | 1/1982 | Wagner et al. | 210/687 |

FOREIGN PATENT DOCUMENTS 1429143   3/1976   United Kingdom .

OTHER PUBLICATIONS

*Journal of the American Chemical Society,* vol. 78, No. 23, Dec. 8, 1956, pp. 5963–5977.
Kunin et al., *Ion Exchange Resins,* (1950), John Wiley & Sons, Inc., pp. 30, 31.

*Primary Examiner*—O. R. Vertiz
*Assistant Examiner*—Wayne A. Langel
*Attorney, Agent, or Firm*—W. J. Lee

[57] ABSTRACT

Removal of Ca++ values from MgCl$_2$ brine is accomplished by use of a crystalline zeolite structure of the empirical formula Na$_{12}$[(AlO$_2$)$_{12}$(SiO$_2$)$_{12}$]·nH$_2$O, where nH$_2$O represents waters of hydration.

10 Claims, No Drawings

REMOVAL OF CA++ FROM MGCL2

BACKGROUND OF THE INVENTION

Aqueous $MgCl_2$ solutions are obtained by various techniques, such as by aqueous chlorination of Mg-containing minerals (e.g., dolomite), by taking natural $MgCl_2$ brines from natural underground deposits, or by chlorination of Mg hydrate which is formed by alkalizing seawater. These $MgCl_2$ brines are useful for various purposes, such as being a source of $MgCl_2$ for use as cell feed to an electrolytic cell where molten $MgCl_2$, dissolved in a molten salt electrolyte, is electrolyzed to form Mg metal at the cathode.

One of the common impurities found in $MgCl_2$ brines is $Ca^{++}$, present as a soluble compound.

Various techniques have been used to substantially reduce the level of $Ca^{++}$ ions in $MgCl_2$ brines, such as by treatment with excess sulfate ions to suppress solubility of the $Ca^{++}$ as $CaSO_4$ which is only slightly soluble in water (whereas $MgSO_4$ is highly soluble); after separating the insolubles there still remains a small amount of $Ca^{++}$ in solution and there still remains a need for sulfate removal from the $MgCl_2$ solution. There is a need for reducing the $Ca^{++}$ content of relatively concentrated $MgCl_2$ solutions in an efficient and expeditious manner, especially $MgCl_2$ solutions which are intended to be the source of $MgCl_2$ as a cell feed to an electrolytic Mg cell.

In the *Journal of The American Chemical Society*, Vol. 78, number 23, Dec. 8, 1956, pp. 5963–5977, there are two companion articles by D. W. Breck, et al. The articles are: *Crystalline Zeolites I. The Properties of a New Synthetic Zeolite, Type A*, and *Crystalline Zeolites. II. Crystal Structure of Synthetic Zeolite, Type A*. These published articles are incorporated herein by reference to show the preparation and analyses of Type A zeolites. These Type A zeolites are said to be represented by the formula $Na_{12}[(AlO_2)_{12}(SiO)_{12}] \cdot 27H_2O$, characterized as cubic, $a_0 = 12.32$ Å., space group $O_h'$-Pm3m, having a 3-dimensional network consisting of cavities 11.4 Å. in diameter separated by circular openings 4.2 Å. in diameter. Removal of the crystal water leaves a stable crystalline solid containing mutually connected intracrystalline voids amounting to 45 Vol. % of the zeolite. The article also discloses that the sodium ions undergo cation exchange in aqueous solution and that for dipositive ions the order of decreasing selectivity of the Type A zeolite was determined to be

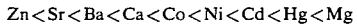

$Zn < Sr < Ba < Ca < Co < Ni < Cd < Hg < Mg$ and in Table VII of the article it is disclosed that the selectivity of $Ca^{++}$ is 0.72 and of $Mg^{++}$ is 0.43, these materials being each tested as 0.2 N solutions at 25° C. The selectivity x (100) is defined as the extent of cation exchange achieved by contacting the zeolite with a solution containing the exact equivalence of exchanging ion.

In the intervening years since the above articles were published, the sodium forms of the synthetic Type A zeolites, conforming substantially to the empirical formula

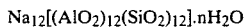

$Na_{12}[(AlO_2)_{12}(SiO_2)_{12}] \cdot nH_2O$ have become known in industry as Type 4A zeolites and are sold as such by Linde Air Products Company, Davison, and others. It is these Type 4A zeolites which are of interest in the present invention.

We have found that in highly concentrated $MgCl_2$ brines that a zeolite of the 4A structure, $Na_{12}[(AlO_2)_{12}(SiO_2)_{12}] \cdot nH_2O$, has an unexpectedly high selectivity for calcium ions with respect to the much higher concentration of magnesium ions. As pointed out above, the selectivities of $Mg^{++}$ and $Ca^{++}$ were tested by Breck, et al at 0.2 N concentrations. With our instant solutions the Mg is on the order of 25 times (or more) the 0.2 N concentration used by Breck, et al. The selectivity as listed by Breck, et al shows zeolite Type 4A to prefer Ca:Mg at a ratio of 72:43 when contacting the zeolite with an exact equivalency of exchanging ions. We have now found that the zeolite, 4A, when challenged by the high-$Mg^{++}$, low-$Ca^{++}$ concentrations still rejects $Mg^{++}$ and removes $Ca^{++}$ to low levels.

Stated another way, one would expect from Breck, et al that with a concentrated $MgCl_2$ brine containing a small percent of $Ca^{++}$ ions, the high concentration of $Mg^{++}$ ions would override the tendency toward $Ca^{++}$ selectivity and that the $Mg^{++}$ selectivity would prevail in such a high concentration.

We have unexpectedly found that the present process, which uses a Type 4A zeolite, selectively removes low concentration $Ca^{++}$ ions from a concentrated $MgCl_2$ brine. The sodium ions which are substituted for the calcium are then readily removed as NaCl which precipitates when the brine is further concentrated. The zeolite can readily be returned (regenerated) to the sodium form with a concentrated NaCl brine.

SUMMARY OF THE INVENTION

In a $MgCl_2$ brine, where the concentration of $MgCl_2$ is in the range of about 30% or more by weight, $Ca^{++}$ ions are reduced from a given level to a lower level by contacting the brine with a synthetic crystalline zeolite which conforms substantially to the empirical formula $Na_{12}[(AlO_2)_{12}(SiO_2)_{12}] \cdot nH_2O$, where $nH_2O$ represents waters of hydration.

DETAILED DESCRIPTIONS

The Type A (or Type 4A) synthetic crystalline zeolite structure of interest in the present invention is as shown above. The number of waters of hydration is indefinite and non-critical and the value of n in the empirical formula is generally in the range of about 5 to about 27.

The $MgCl_2$ brine has a concentration of at least about 30% $MgCl_2$ by wt., preferably about 34% to about 38%; though the concentration can be as high as 38% at 100° C.

The amount of $Ca^{++}$ ion (as $CaCl_2$) in the $MgCl_2$ brine before contact with the zeolite exchanger is generally in the range of about 1.0% to about 3.0% by weight, but it can be more or less.

After undergoing one or more ion exchange treatments with the zeolite, the $MgCl_2$ brine product generally contains less than about 0.4% $Ca^{++}$ as $CaCl_2$ by weight (based on 100% $MgCl_2$) preferably less than about 0.13% $CaCl_2$, and is generally in the range of about 0.06% to about 0.10% $CaCl_2$, but it can be lower.

In carrying out the present process, the zeolite is contained in a vessel, such as a column, and is completely wetted or covered with a NaCl brine.

The NaCl brine is preferably washed out or pushed out by using a pure $MgCl_2$ solution (e.g., 3–30% conc.) which contains virtually no $Ca^{++}$. Then the Ca-contaminated MgCl$_2$ feed stream is passed through the bed of zeolite until analysis shows the Ca$^{++}$ is breaking through with the MgCl$_2$ effluent.

The flow of MgCl$_2$ feed stream is stopped and the MgCl$_2$ in the zeolite is replaced by NaCl brine which, because of the high concentration of Na$^+$ ions causes the zeolite to convert from the Ca$^{++}$ form back to the Na$^+$ form and the Ca$^{++}$ ions flow out (as CaCl$_2$) with the effluent. The NaCl brine-containing zeolite is once again ready for contact with MgCl$_2$ brine.

As with the general practice of ion exchange processes, well known to practitioners, the effluent from the zeolite can be cut into fractions to isolate portions which contain the various concentrations of brines.

The temperature at which the ion exchange process is operated may be in the range of about 20° C. to about 120° C., preferably in the range of about 70° C. to about 95° C.

Analyzing of the fractions for Ca$^{++}$ and Mg$^{++}$ may be done by standard versene titration.

EXAMPLE 1

Zeolite of Type 4A structure is prepared from 113.6 gm. of Na$_2$SiO$_3$.9H$_2$O in 450 cc H$_2$O to which is added 85.2 gm of a solution prepared from 5 mol of Bayerite (Al(OH)$_3$) and 7.5 mol. of 50% NaOH. The cold (ambient temp.) mixture is well stirred to form a fine dispersion of creamy texture and then heated to 90° C. for about 15 minutes; the mixture has a volume of 610 cc. After removing 305 cc of the mixture, 20 gm of 1-micron zeolite (sold as VALFOR ®) is stirred in at 90° C. for 15 minutes, then the removed portion (305 cc) is added in about 40 cc increments every 4 minutes. After final addition, heating is continued for about 15 minutes. The slurry is filtered and well washed with H$_2$O to yield agglomerated 4A zeolite with particle size from about 5–25 microns. Each agglomerate is made up of numerous particles of the 5–25 micron size.

About 100 cc of the agglomerated zeolite 4A is tested in a column of about 8″ in height which is equipped with a jacket to permit circulation of a temperature-controlled heat transfer fluid. The zeolite is retained on a medium glass frit within the column.

The column is first treated with a saturated NaCl brine, then a flow of 21% MgCl$_2$ (pure), then a solution containing 4.85 molar MgCl$_2$, 0.102 molar CaCl$_2$, and NaCl up to saturation. This is followed by the 21% MgCl$_2$ (about 2.6 molar Mg$^{++}$) (pure), then saturated NaCl brine. Flow rate is 3.34 cc/min. at 85°–90° C. Effluent samples (cuts) of 10 cc each are collected and analysed by standard versene titration for Ca$^{++}$ and Mg$^{++}$. The results are shown in Table I. In Table I, "DO" means "ditto"; a series of dashes indicates no analysis made.

TABLE I

| Cut | Molar Ca$^{++}$ | Molar Mg$^{++}$ | Flow Remarks | Cut | Molar Ca$^{++}$ | Molar Mg$^{++}$ | Flow Remarks |
|---|---|---|---|---|---|---|---|
| 1 | 0.052 | 0.264 | 21% MgCl$_2$ | 28 | nil | — | Mg/Ca feed |
| 2 | 0.048 | 0.092 | 21% MgCl$_2$ | 29 | nil | — | Mg/Ca feed |
| 3 | 0.044 | 0.076 | 21% MgCl$_2$ | 30 | 0.012 | 4.855 | Mg/Ca feed |
| 4 | 0.032 | 0.081 | Mg/Ca feed | 31 | — | — | Mg/Ca feed |
| 5 | 0.036 | 0.076 | Mg/Ca feed | 32 | 0.024 | — | Mg/Ca feed |
| 6 | 0.036 | 0.088 | Mg/Ca feed | 33 | — | — | Mg/Ca feed |
| 7 | 0.024 | 0.108 | Mg/Ca feed | 34 | 0.024 | 4.916 | Mg/Ca feed |
| 8 | 0.032 | — | Mg/Ca feed | 35 | — | — | Mg/Ca feed |
| 9 | 0.020 | — | Mg/Ca feed | 36 | 0.032 | — | Mg/Ca feed |
| 10 | 0.024 | 0.136 | Mg/Ca feed | 37 | 0.032 | — | Mg/Ca feed |
| 11 | 0.020 | 0.988 | Mg/Ca feed | 38 | 0.032 | 4.888 | Mg/Ca feed |
| 12 | 0.016 | 1.404 | Mg/Ca feed | 39 | — | — | Mg/Ca feed |
| 13 | 0.020 | 2.212 | Mg/Ca feed | 40 | 0.044 | 4.836 | Mg/Ca feed |
| 14 | 0.016 | 3.120 | Mg/Ca feed | 41 | — | — | 21% MgCl$_2$ |
| 15 | 0.016 | 3.834 | Mg/Ca feed | 42 | — | — | 21% MgCl$_2$ |
| 16 | nil | 3.92 | Mg/Ca feed | 43 | — | — | 21% MgCl$_2$ |
| 17 | nil | 4.54 | Mg/Ca feed | 44 | — | — | NaCl |
| 18 | nil | 4.54 | Mg/Ca feed | 45 | — | — | NaCl |
| 19 | nil | 4.64 | Mg/Ca feed | 46 | 0.048 | 4.862 | NaCl |
| 20 | nil | 4.74 | Mg/Ca feed | 47 | 0.064 | — | NaCl |
| 21 | nil | — | Mg/Ca feed | 48 | 0.084 | 4.686 | NaCl |
| 22 | nil | — | Mg/Ca feed | 49 | 0.140 | 4.43 | NaCl |
| 23 | nil | — | Mg/Ca feed | 50 | 0.184 | 3.926 | NaCl |
| 24 | nil | — | Mg/Ca feed | 51 | 0.196 | 3.544 | NaCl |
| 25 | nil | — | Mg/Ca feed | 52 | 0.168 | 3.182 | NaCl |
| 26 | nil | 4.856 | Mg/Ca feed | 53 | 0.124 | 2.772 | NaCl |
| 27 | nil | — | Mg/Ca feed | | | | |

EXAMPLE 2

A second test was made under nearly identical conditions as Example 1 above, but the feed brine was 0.518 molar Ca$^{++}$ and 3.99 molar Mg$^{++}$. Even with this feed of higher Ca$^{++}$, lower Mg$^{++}$ the Ca$^{++}$ was preferred.

EXAMPLE 3

A commercial sample of Linde ® 4A zeolite molecular sieve was ground wet in a Waring ® blender and screened to −50 mesh and the very fine material removed by washing. This product was tested in the same column of Example 1 using the same brine as in Example 2. Again, the zeolite displayed the ability to remove Ca$^{++}$ from the MgCl$_2$ solution at a surprisingly high selectivity.

EXAMPLE 4

The effect of particle size of type 4A zeolites was tested using screenings which were retained on a 30-mesh screen (U.S. Standard Sieve) but which passed through a 10-mesh screen, compared with screenings which passed through the 30-mesh screen and screenings which passed through a 50-mesh screen. The smaller particles which passed through the 30-mesh screen and the 50-mesh screen were more efficient than the larger particles and $Ca^{++}$ breakthrough was not encountered until greater volumes of feed were passed through, using substantially the same exchange column, process, and feed of Example 1 above.

EXAMPLE 5

A sample of commercially-available type 4A zeolite was wet ground and screened to collect the portion passing through a 20-mesh screen and collected on a 50-mesh screen.

The same column, process (90° C.) and brine feed as used in Example 1 above was used here except that water was added to dilute the $Ca^{++}$ from a 0.102 molar feed to a 0.096 molar feed; also, the saturated 26% NaCl brine was also diluted 4 volumes/1 volume $H_2O$ for use as the regenerate. Data is given in Table II below for cuts 11–99. The first cut was 50 cc and all others were 10 cc. The density of cuts 2–10 were measured as follows:

| Cut | g/cc Density | Cut | g/cc Density |
|---|---|---|---|
| 2 | 1.165 | 7 | 1.276 |
| 3 | 1.164 | 8 | — |
| 4 | 1.214 | 9 | 1.314 |
| 5 | 1.249 | 10 | 1.316 |
| 6 | 1.273 | | |

In addition, the molar concentration of $Mg^{++}$ in cut 10 was measured as being 4.22. In Table II a series of 3 dashes means no analysis was made.

TABLE II

| Cut | Molar $Ca^{++}$ | Molar $Mg^{++}$ | Cut | Molar $Ca^{++}$ | Molar $Mg^{++}$ | Cut | Molar $Ca^{++}$ | Molar $Mg^{++}$ |
|---|---|---|---|---|---|---|---|---|
| 11 | .004 | — | 41 | .085 | 5.06 | 72 | .021 | — |
| 12 | .005 | — | 42 | .079 | — | 73 | — | — |
| 13 | .005 | — | 43 | .083 | 5.06 | 74 | .022 | — |
| 14 | — | 4.81 | 44 | .064 | — | (upflow $MgCl_2$) | | |
| 15 | .008 | — | 45 | .054 | 5.09 | 75 | ]* | |
| 16 | .009 | — | 46 | .071 | — | 76 | | |
| 17 | — | — | 47 | .119 | 4.89 | 77 | .033 | .029 |
| 18 | .017 | — | 48 | .197 | 4.153 | 78 | | |
| 19 | .020 | — | 49 | .295 | 3.33 | 79 | ] | |
| 20 | — | — | 50 | .307 | 2.37 | 80 | .003 | .037 |
| 21 | — | — | 51 | .263 | 1.75 | 81 | .001 | .040 |
| 22 | .024 | — | 52 | .238 | 1.40 | 82 | — | .170 |
| 23 | .025 | — | 53 | .194 | 1.04 | 83 | — | 2.95 |
| 24 | — | — | 54 | .157 | .86 | 84 | — | 3.70 |
| 25 | .028 | — | 55 | .103 | .58 | 85 | — | 4.16 |
| 26 | .027 | — | 56 | .09 | — | 86 | .001 | 4.42 |
| 27 | — | — | 57 | .065 | — | 87 | — | — |
| 28 | — | — | 58 | ]* | | 88 | — | — |
| 29 | .033 | — | 59 | | | 89 | — | — |
| 30 | .035 | — | 60 | .065 | — | 90 | — | — |
| 31 | .037 | — | 61 | | | 91 | — | — |
| 32 | .047 | — | 62 | ] | | 92 | .009 | 4.95 |
| 33 | .0488 | — | 63 | .046 | — | 93 | — | — |
| 34 | .048 | — | 64 | ]* | | 94 | .006 | — |
| 35 | .050 | — | 65 | | | 95 | .013 | — |
| 36 | .047 | — | 66 | .037 | — | 96 | .017 | 5.08 |
| 37 | .053 | — | 67 | | | 97 | .027 | — |
| 38 | .055 | — | 68 | ] | | 98 | .030 | — |
| 39 | .055 | — | 69 | .031 | — | 99 | .0280 | 5.08 |
| 40 | .055 | 5.02 | 70 | .032 | — | | | |
| (downflow NaCl) | | | 71 | .026 | — | | | |

*Cuts combined before analysis.

The foregoing examples illustrate the practice of the invention, but the invention is not limited to the particular embodiments illustrated.

We claim:

1. A process for substantially reducing the amount of a $Ca^{++}$ ion impurity in a $MgCl_2$ brine, where the $MgCl_2$ is at a concentration of at least about 30% by weight, said process comprising contacting said $MgCl_2$ brine with a crystalline synthetic zeolite having the empirical formula $Na_{12}[(AlO_2)_{12}(SiO_2)_{12}]\cdot nH_2O$ where $nH_2O$ represents waters of hydration, and recovering from said zeolite the $MgCl_2$ brine with the $Ca^{++}$ ion impurity reduced to a lower level than the initial impurity level.

2. The process of claim 1 wherein the particle size of the zeolite is in the range of about 5 to about 25 microns, said particles being agglomerated.

3. The process of claim 2 wherein the agglomerates are of a size which pass through a 10-mesh screen.

4. The process of claim 2 wherein the agglomerates are of a size which pass through a 30-mesh screen.

5. The process of claim 2 wherein the agglomerates are of a size which pass through a 50-mesh screen.

6. The process of claim 1 wherein there is performed the additional steps of regenerating the zeolite to the $Na^+$ form by washing it with NaCl brine, thereby also substantially removing the $Ca^{++}$ from the zeolite, the regenerated zeolite being re-usable in the process.

7. The process of claim 1 wherein the initial $Ca^{++}$ ion impurity level of the $MgCl_2$ brine is as much as about 3.0% (as $CaCl_2$) and the $Ca^{++}$ ion impurity level of the $MgCl_2$ brine after treatment with the zeolite is lower than about 0.4% (as $CaCl_2$).

8. The process of claim 1 wherein the value of n in the formula is a value in the range of about 5 to about 27.

9. The process of claim 1 wherein the concentration of $MgCl_2$ in the $MgCl_2$ brine is in the range of about 30% to about 38% by weight.

10. The process of claim 1 wherein the concentration of $MgCl_2$ in the $MgCl_2$ brine is in the range of about 34% to about 38% by weight.

* * * * *

UNITED STATES PATENT AND TRADEMARK OFFICE
CERTIFICATE OF CORRECTION

PATENT NO. : 4,364,909

DATED : December 21, 1982

INVENTOR(S) : John M. Lee and William C. Bauman

It is certified that error appears in the above—identified patent and that said Letters Patent is hereby corrected as shown below:

Col. 1, line 52; all the symbols "<" should be -->--.

Col. 6, line 25; "as much as" should be --an amount up to--.

Signed and Sealed this

Fifth Day of April 1983

[SEAL]

Attest:

GERALD J. MOSSINGHOFF

Attesting Officer     Commissioner of Patents and Trademarks